INVENTOR
WILLIAM W. PHARIS
BY
Francis E. Blake
ATTORNEY

July 3, 1956 W. W. PHARIS 2,753,401

BUSY VERIFICATION

Filed March 30, 1954 5 Sheets-Sheet 2

INVENTOR
WILLIAM W. PHARIS
BY
Francis E. Blake
ATTORNEY

INVENTOR
WILLIAM W. PHARIS
BY
Francis E. Blake
ATTORNEY

July 3, 1956 W. W. PHARIS 2,753,401

BUSY VERIFICATION

Filed March 30, 1954 5 Sheets-Sheet 4

INVENTOR
WILLIAM W. PHARIS
BY
[signature]
ATTORNEY

July 3, 1956 W. W. PHARIS 2,753,401

BUSY VERIFICATION

Filed March 30, 1954 5 Sheets-Sheet 5

INVENTOR
WILLIAM W. PHARIS
BY
Francis E. Blake
ATTORNEY 2,753,401

BUSY VERIFICATION

William W. Pharis, Rochester, N. Y., assignor, by mesne assignments, to General Dynamics Corporation, a corporation of Delaware Application March 30, 1954, Serial No. 419,649

4 Claims. (Cl. 179—27)

This invention relates to telecommunication systems and particularly to remote control arrangements in dial telephone systems.

The object of the invention is to provide means whereby a toll operator who has established a connection to a distant called subscriber's line has encountered a busy condition may by a simple operation verify such condition by calling for and receiving a different kind of busy indication.

In systems of the type herein employed when a busy called line is encountered the usual busy signal is in the form of (1) a means to flash a supervisory lamp in the operator's cord circuit, and (2) a busy tone applied to the talking circuit and which will be audible to the operator. The system to which the present invention is applied is one which may serve a community having many multiparty lines and in which any given called line may reasonably be expected to be busy a large part of the time. Since toll and long distance calls are considered to be often of more importance than some of the party line traffic, it is necessary that the toll operator be provided with means to verify the actual busy condition of such a line. Accordingly, when a toll operator meets such a busy condition, conventionally reported, she now has means responsive to the dialing of another (suffix) digit to (1) disconnect the busy signal from the line and (2) cut through a talking circuit to the called line so that if she deems it proper she may break in on a conversation with a request that she may complete a more important call.

A feature of the invention is means responsive to a suffix digit or a simple short interruption of the established connection for disconnecting a busy signal applied to the connection at the distant end and to cut through a talking connection thereat around the normally open contacts of a cut through relay which has failed of operation due to the busy condition of the line.

Another feature of the invention is a means responsive to a suffix digit, transmitted as a complete signal rather than a series of interruptions, to rearrange a distant circuit to terminate the transmission of a busy signal and to extend a talking connection to a called line normally barred to such a talking connection.

Still another feature of the invention is a circuit arrangement available only to a toll operator for establishing a talking connection to a busy line. In accordance with this feature the unique connector of the present invention is arranged, after a busy called line has been encountered, to respond differently to an additional digit. Normally a connector responds to the line interruptions constituting the digital pulses, but the present arrangement is such that the verification circuit responds only to a side effect of the dialing and not to the train of digital pulses per se. Thus the means for breaking in on a busy connection is not available to the ordinary subscriber but only to a toll operator. More specifically, another digit dialed after a busy line has been encountered will have no effect in the conventional calling bridge circuit but in an out dial trunk accessible only to a toll operator such digit will be translated into an operation over the so-called HS circuit or fourth conductor so that a signal corresponding to a train of (and not to the individual) pulses will be transmitted to the connector and there employed for the purposes set forth.

Other features will appear hereinafter.

The drawings consist of five sheets having seven figures, as follows.

Figure 7:
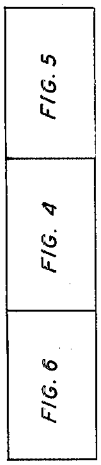
Figure 3:
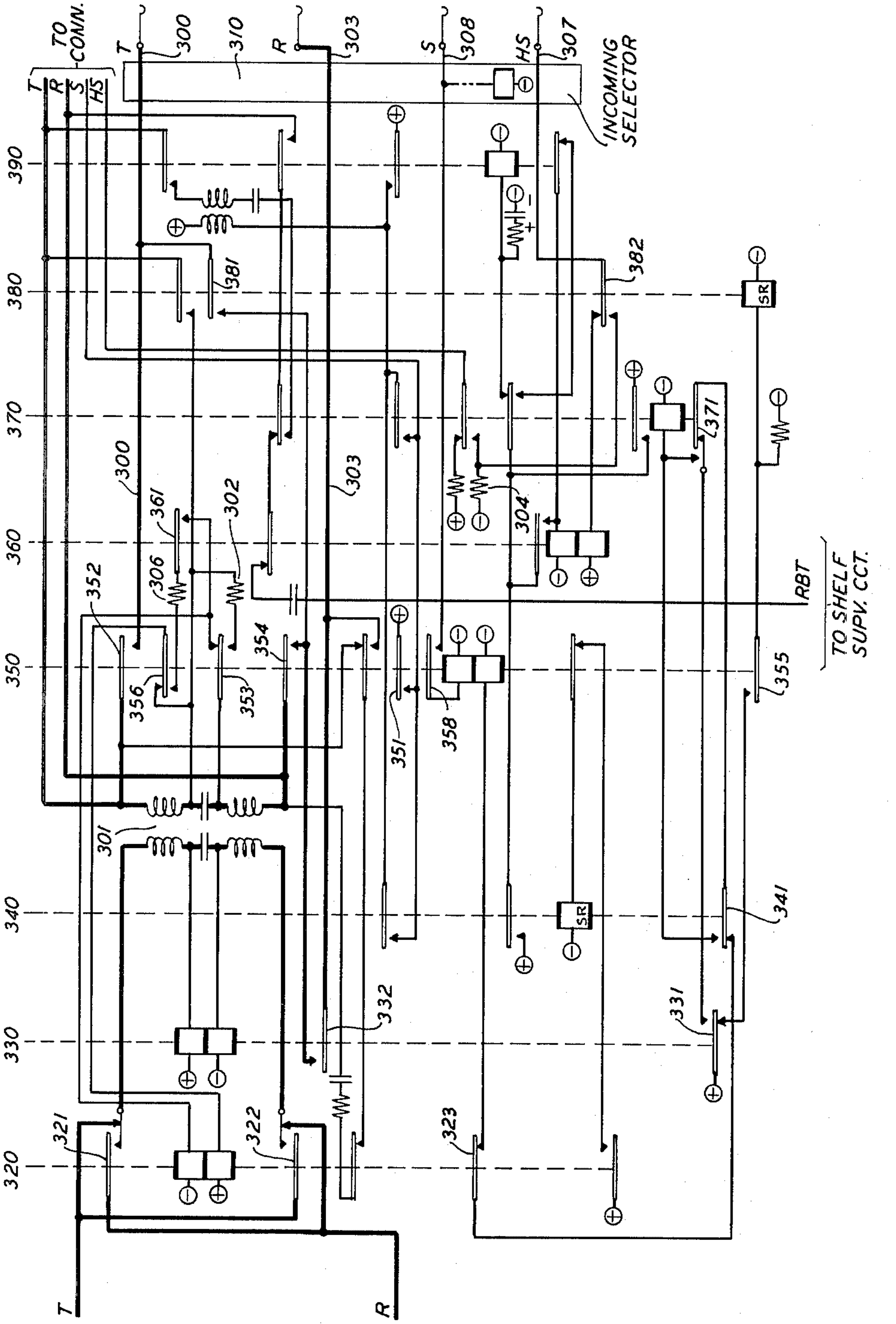
Fig. 3 is a circuit diagram of the distant end of the trunk terminating in an incoming selector.
Figure 4:
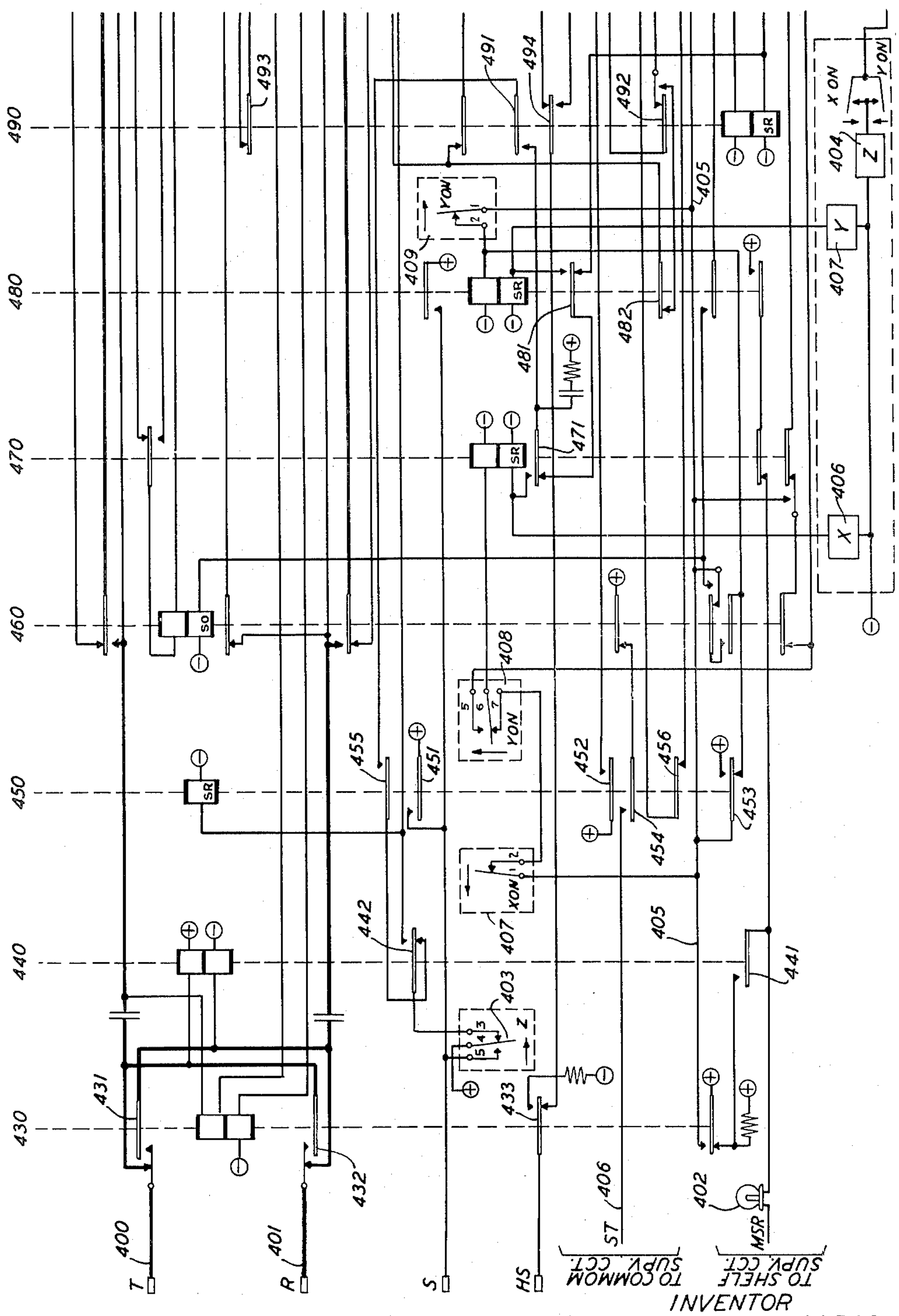
Figure 5:
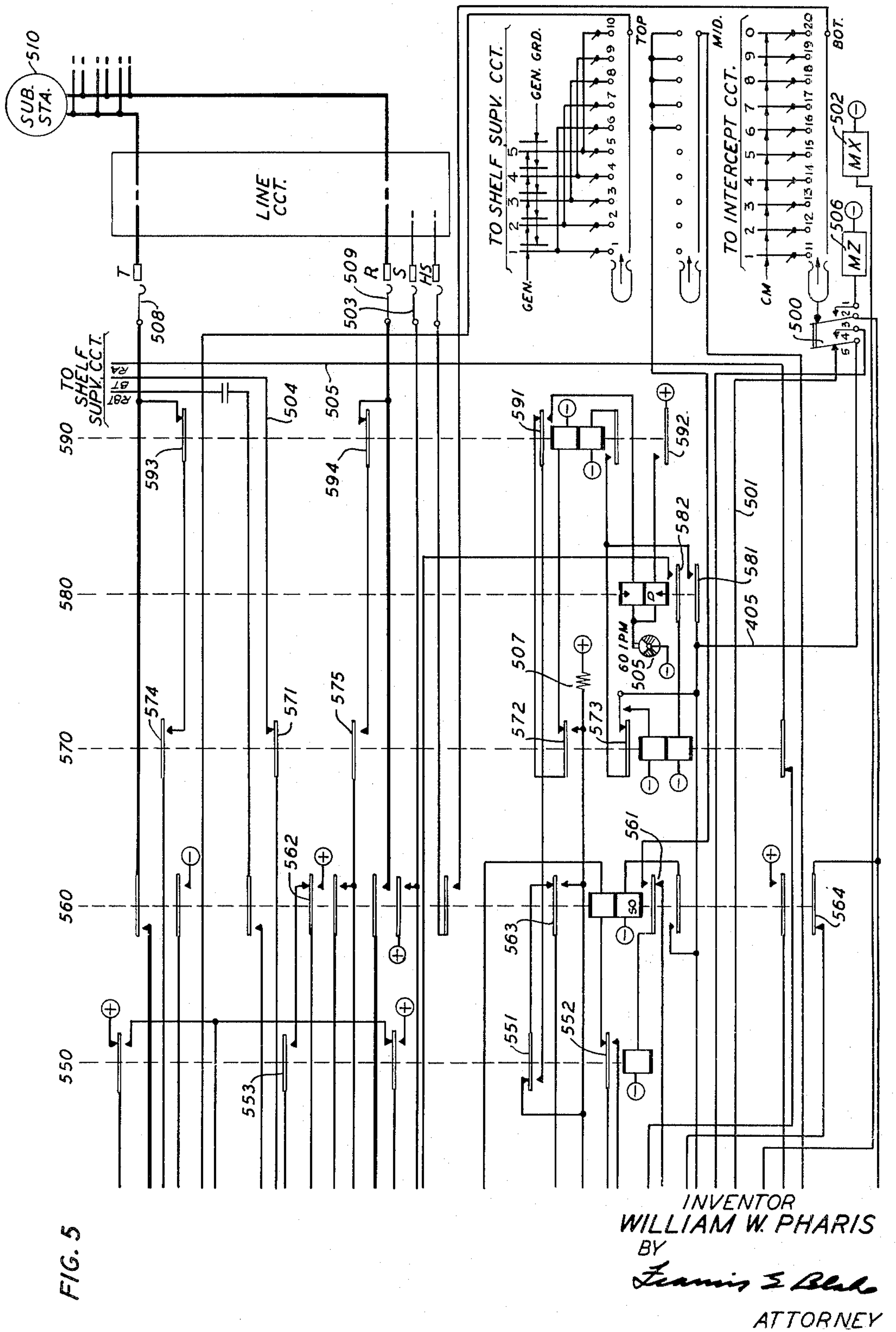
Figure 6:
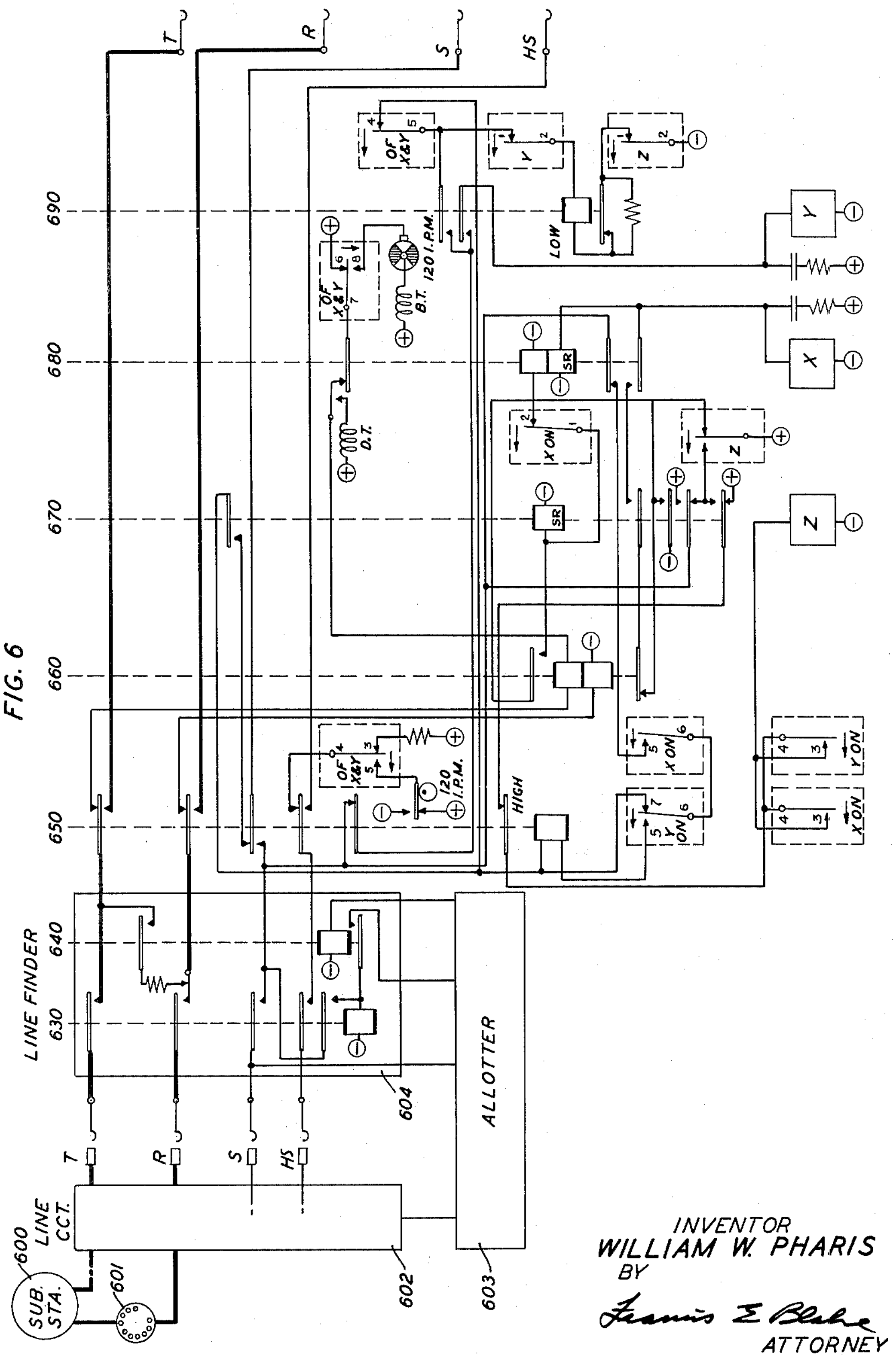

Figs. 4 and 5 together constitute a circuit diagram of a connector switch embodying the features of the present invention;

Fig. 6 is a circuit diagram of a conventional arrangement of a dial station calling line and the switching means used to extend it; and Fig. 7 is a block diagram showing how Figs. 6, 4 and 5 may be placed to illustrate one aspect of the present invention.

Figure 2:
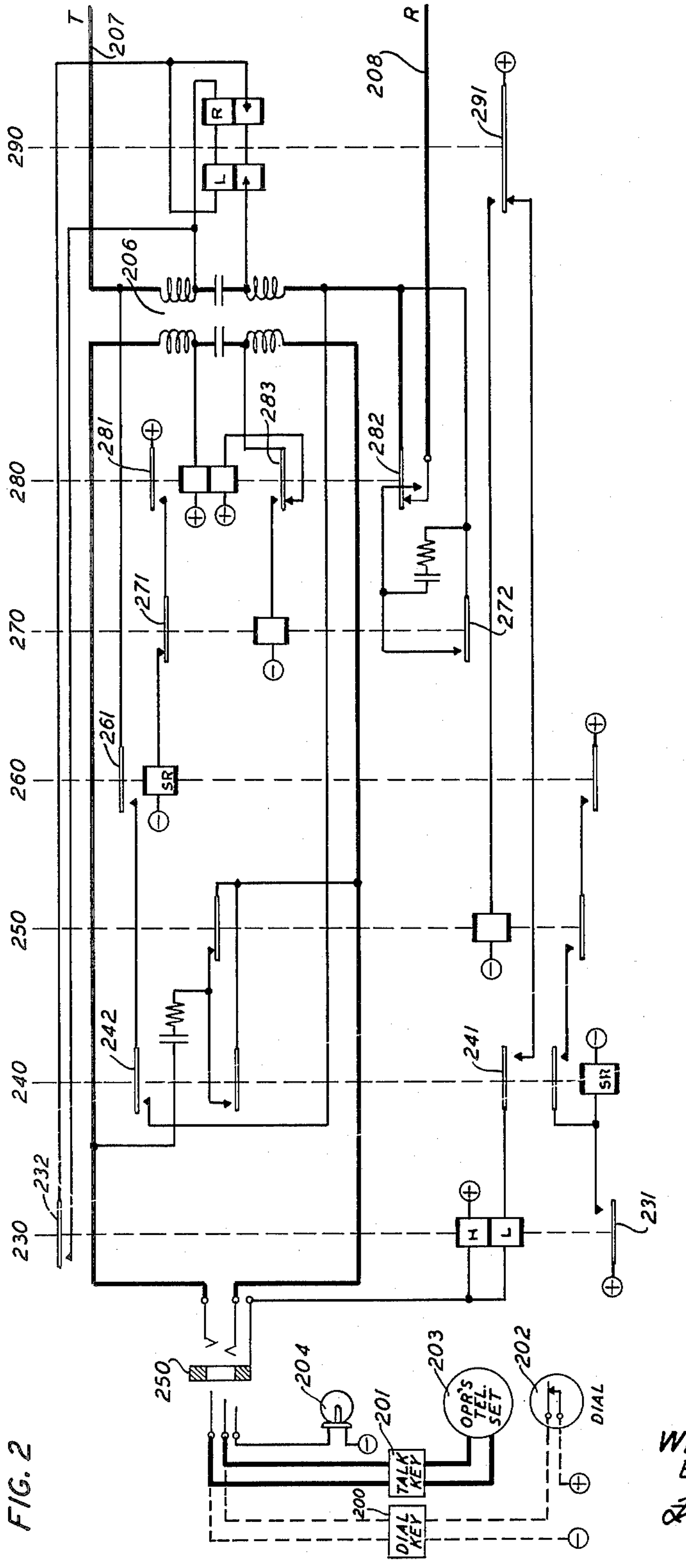
Fig. 2 is a skeletonized circuit diagram of a cord circuit and an out dial trunk leading to a distant point.
Figure 1:
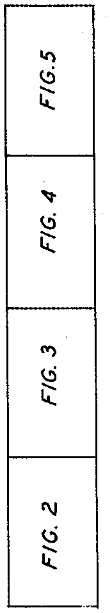
Fig. 1 is a block diagram showing how Figs. 2, 3, 4 and 5 may be placed to form a schematic circuit diagram illustrating the present invention.

The cord circuit used in the present invention is shown at the extreme left of Fig. 2 and comprises means here shown as a dial key 200 and a talk key 201 for connecting the dial and the operator's telephone set to the cord circuit. In actual practice there is a talk key which connects the operator's equipment to the cord circuit so that while this is actuated the operation of the dial will, through its off normal contacts, cause the operation of a relay whereby the dial is connected to the cord circuit until the dial has run down to its normal position. It will be noted that when the dial is operated a source of battery is connected to the tip, and ground through dial 202 is connected to the ring. The operator's set 203 is connected across the tip and ring. A supervisory lamp 204 is connected to the sleeve and this will operate in what is known as a high low circuit. The normal circuit for the lamp 204 is through the sleeve circuit and thence through the upper winding of relay 230 to ground, but since the resistance of this upper winding is high the lamp will not burn brightly. However, when the circuit is completed at some later time, through the low resistance lower winding of relay 230, the lamp 204 will burn brightly.

When the operator inserts the plug into the jack 205, the circuit just described through the high resistance winding of relay 230 is closed and this relay will operate. Through its armature 231 an obvious circuit will be closed for the slow release relay 240 whereupon another circuit will be closed from the ground, the armature 291 of relay 290, the front contact and armature 241 of relay 240, the lower low resistance winding of the sleeve relay 230 and thence through the supervisory lamp 204 to battery. Thus the supervisory lamp will light. It will be apparent that the condition of this lamp will depend upon the operation of the polarized relay 290 and it will later be shown that when the called party at the distant end answers and the current in the two wire trunk is reversed, then the polarized relay 290 will operate and will cause the supervisory lamp 204 to go dark.

When the operator has seized the out dial trunk of Fig. 2 in the manner described and when she operates the dial 202, a circuit will be established from ground, the upper winding of relay 280, the upper left winding of the repeating coil 206, over the tip of the line through the circuit here marked dial key 200 to battery. Thereupon relay 280 will operate and through its armature 281 will close an obvious circuit to the slow release relay 260, Upon the operation of the off normal relay 280 a circuit is established from ground through the dial 202, the ring of the trunk, the lower left hand coil of the repeating coil 206, armature 283 of the relay 280, thence through the pulse relay 270 to battery. This relay opens the circuit for the slow release relay 260 by means of its armature 271, thus preventing its operation at this time since it is slower to operate than relay 270. Through the operation of relays 280 and 270, the armature 272 is substituted in the trunk circuit for the armature 282 and its normal contact. Therefore the armature 272 of relay 270 becomes the pulsing contact for operating the pulse relay at the distant point. Therefore, as relay 270 responds to the train of pulses created by the dial 202, the circuit through the armature 272 will be opened each time the dial contacts are opened. The release of relay 270 on each dial pulse completes a circuit to relay 260 through armature 272. Relay 272 operates on the first pulse of each digit and remains operated for the remaining pulses since it is slow to release. Contacts 281 complete a short circuit to the right side of the repeating coil to improve pulsing.

When the dial has completed its operation, relay 280 will return to normal and the pulse relay 270 will be taken out of circuit.

When the out dial trunk of Fig. 2 is seized and the sleeve relay 230 is operated, a circuit is closed by the armature 232 for short circuiting the two upper windings of relay 290 so that the distant relay 330 will be operated in an obvious circuit over the tip and ring conductors of the trunk and through the reversing contacts of armatures 321 and 322 of the relay 320. Thereupon the outgoing trunk is seized. This is signalized immediately by the establishment of a circuit from ground, armature 331 and its front contact, armature 371 and its back contact, armature 341 of the slow release relay 340, armature 323 through the lower winding of the switch through relay 350 to battery. This relay operates all of its contacts and effectively extends the trunk to the wipers of this incoming switch. Immediately a ground is extended through armature 351 to the sleeve wire leading to the connector bank terminals to mark this two way trunk as busy.

The switch through relay 350, in operating, closes a circuit from the tip conductor 300 of the incoming switch through the front contact and armature 352, the upper right winding of the repeating coil 301, the resistor 302, the front contact and armature 353, the lower right winding of the repeating coil 301, the armature 354 and its front contact, the front contact and armature 332, now operated, to the ring conductor of the incoming switch 303. The operating means of the incoming switch are purely conventional such as the selector switch shown in Fig. 6 and are indicated here merely by a rectangle before the brushes of this switch, including the switch through relay 310, the only relay remaining operated after the connection has been established.

The operation of the switch through relay 350 also prepares a circuit through its armature 355 for the slow releasing relay 380 so that during pulsing as the relay 330 responds to the train of pulses the relay 380 will respond to the train as a whole.

It should be noted particularly at this point that the slow releasing relay 380 is only opearted during the transmission of a train of pulses. Therefore the HS conductor 307 of the incoming switch normally connected to resistance ground through the armature 382 and back contact of relay 380 and the lower winding of relay 360 to ground, is used to transmit a digit pulse train signal by the alternative connection through the armature 382 and its front contact and the resistance 304 to battery. The circuit through the conductor 307 constitutes another channel parallel to and established simultaneously with the talking circuit embodied in the tip and ring conductors.

When the operator at the distant office dials, the pulse relay 330 will respond and upon restoring momentarily on the first impulse of the series causes the above described circuit for relay 380 to be closed. Through its armature 381 this relay shunts the right hand windings of the repeating coil 301 to prevent impulse distortion and through its armature 382 changes the connection of the HS wiper of the incoming switch from a ground to a battery connection through the resistor 304. The pulse relay 330 reoperates at the end of the first impulse reclosing the tip and ring loop to the incoming switch at its armature 332 and recloses the circuit through the lower winding of the switch through relay 350. It may be noted that this relay is left dependent upon its upper winding now connected to the sleeve conductor 308 during the release of the relay 330 in conventional manner. The sleeve 308 leading to the armature 358 will be grounded in the incoming selector circuit until the connection is finally released whereby relay 350 will remain operated until that time.

The remaining pulses of the series are repeated by the relay 330 as described above. The slow releasing relay 380 remains operated during dial pulses due to its slow releasing characteristics. The pulse relay 330 on reoperating upon the last impulse of the series recloses a circuit to relay 350 and opens this circuit to relay 380. Relay 380 restores, removes the shunt from the tip and ring conductors to the incoming switch, thus establishing the talking circuit and transfers the incoming selector HS lead from resistance battery through resistance 304 to resistance ground through the lower winding of the HS relay 360. During the remaining series of dial impulses the circuit will function as described above.

When the called party answers the connector circuit transfers the HS lead from resistance ground to resistance battery whereupon relay 360 operates. Responsive to the operation of relay 360 a circuit is established from battery, the upper winding of the relay 320, the front contact and armature 361, the resistor 306, the front contact and armature 356, the lower winding of the relay 320 to ground, whereby this relay operates and causes a reversal of battery to the distant relay 290. This signals the operator, in the manner hereinbefore described, that the called party has answered.

When the connector of Figs. 4 and 5 is seized, a bridge will be established from the tip 400 to the ring 401, whereupon a circuit may be traced through the alternate contacts of armature 431, the upper winding of the calling bridge relay 440 and through the alternate contacts of the armature 432 through the lower winding of the calling bridge relay 440 to battery. Thus the calling bridge relay 440 operates and through its armature 441 closes a circuit to the monitor lamp 402 and through its armature 442 closes a circuit for the first slow relay 450 which may be traced from ground, the armature and back contact 403 of the Z release magnet 404, armature 442 and its front contact and thence through the winding of the first slow release relay 450. This latter relay operates and through its armature 451 applies ground to the sleeve to hold the preceding equipment in the usual manner and to mark this circuit as busy to other calls. Through its armature 452 the relay 450 places a ground on the upper winding of the switch through relay 560 for purposes which will appear hereinafter. Through its armature 453 the first slow relay also applies ground to conductor 405, known as the master ground. Through its armature 454 the relay grounds the start lead 406 for conventional purposes.

Ground on the master ground lead 405 is extended through the X off normal contacts 407, the Y off normal contacts 408, to the upper winding of relay 470 whereby this relay becomes operated. Likewise ground on the master ground lead 405 is extended through the Y off normal contact 409 to the upper winding of relay 480 so that this relay becomes operated. Again the master ground lead 405 is extended through the off normal contacts of the minor switch 500 over the lead 501 to the upper winding of relay 490 so that this relay becomes operated. The connector is now in condition to respond to dial pulses.

On the first pulse of the dial for the first digit the selector bank tip and ring loop is opened to relay 440 so that this relay restores and closes a circuit from ground, the contacts 403 of the release magnet 404, the armature 442 and its back contact, the armature 455 and its front contact, armature 491 and its front contact, the armature 471 and its front contact through the lower winding of relay 470 to battery, thus holding this relay operated during the series of pulses constituting the first digit since its original circuit is opened on the first step of the switch in the X direction through the operation of the X off normal contacts 407. At the end of the first pulse the selector bank tip and ring loop is reclosed to relay 440. Relay 470 and relay 450 remain operated during dial impulses due to their slow release characteristics. The remainder of the series of dial pulses moves the XY switch in the X direction to the desired level since the pulses supplied over the armature 471 beside causing the operation of the slow relay 470 are led also through the X magnet 406. At the end of the series of pulses the calling bridge relay 440 remains operated and therefore opens the circuit to the lower winding of relay 470 and the X magnet 406. In time relay 470 restores and prepares a circuit for relay 480 and the Y magnet 407 in parallel.

On the first impulse of the second digit the selector bank tip and ring loop is opened to the relay 440. This relay restores, opens the circuit to the first slow relay 450 and closes a circuit to the lower winding of relay 480 and the Y magnet 407 in parallel. This circuit may be traced from ground, the armature and back contact 403 of the Z magnet, the armature 442 and back contact of relay 440, the armature 455 and its front contact, the armature 491 of relay 490 and its front contact, the armature 471 of relay 470 and its back contact, the armature 481 of relay 480 and its front contact and thence in one direction through the lower winding of relay 480 to battery and in the other direction through the winding of the Y magnet 407 to battery. The Y magnet 407 operates, moving the XY switch one step in the Y direction and operating the Y off normal contacts. At the end of the first pulse of the second series the selector bank tip and ring loop is reclosed to the calling bridge relay 440. This relay reoperates, recloses a circuit to relay 450 and opens the circuit to relay 480 and the Y magnet 407. Relay 480 and relay 450 remain operated during dial pulses due to their slow release characteristics. The remainder of the series of dial pulses moves the XY switch in the Y direction to the desired line. At the end of the train of pulses the calling bridge relay 440 remains operated, opening the circuit to relay 480 and the Y magnet 407. In time relay 480 restores and prepares a circuit to relay 490 and the MX stepping magnet of the minor switch 502 in parallel. The busy test relay 550 is connected to the sleeve wiper of the connector in a circuit which may be traced from battery, the winding of the relay 550, the armature 561 of the switch through relay 560, its back contact, the operated contacts of armature 492 of relay 490, the back contact and armature 482 of relay 480 to the sleeve wiper 503 so that following the release of relay 480 and before relay 490 may be released, a busy test of the called line may be made.

On the first pulse of the third digit the selector bank tip and ring loop is opened to the calling bridge relay 440 in the usual manner. This relay restores, opens the circuit to the first slow relay 450 and closes a circuit to the lower winding of relay 490 and the stepping magnet 502 of the minor switch used for selecting the particular ringing current for the wanted party. This circuit may be traced over the circuit hereinbefore traced to the armature 481 of relay 480 now through its back contact to the lower winding of relay 490 and the winding of the MX magnet 502 in parallel. The MX magnet responds to this third series of pulses representing the third digit.

On its first step the minor switch opens the circuit through the conductor 501 to the upper winding of relay 490. Relay 490 and relay 450 remain operated due to their slow release characteristics. The calling bridge relay upon reoperating after the last pulse of the series closes a circuit to relay 450 and opens the circuit to relay 490 and the MX magnet 502. During the period after relay 480 has restored the busy test is made as hereinbefore mentioned.

If the called line is found to be idle then the conventional operations will take place. If, on the other hand, the called line is found to be busy, the busy test relay 550 will respond to a ground found on the sleeve contact connected into the line circuit of the called line. When relay 550 operates it prepares a circuit through its armature 551 for connecting a source of 60 interruptions per minute to the HS lead in the selector bank terminals at a later period. Through its armature 552 relay 550 opens the circuit to the upper winding to the switch through relay 560. At the same time the busy tone conductor 504 is connected through the back contact and armature 571, the back contact and armature 493, the armature 553 and front contact of the busy test relay 550, the back contact and armature 562, the upper winding of the answer bridge relay 430 to the tip conductor of the trunk so that busy tone is transmitted to the distant operator in conventional manner. Relay 550 closes a locking circuit for itself, from ground through the armature 452 of the first slow relay 450, the armature 552 and front contact of the busy test relay 550, the armature 492 and back contact of the relay 490, the back contact and armature 561 of the switch through relay 560 to the winding of the busy test relay 550.

Relay 490, restoring after the third digit, closes the holding circuit to relay 550, applies busy tone from the busy tone lead 504 to the calling line and connects 60 IPM battery to the selector bank HS lead over the circuit which may be traced from the 60 IPM interrupter 505, the upper winding of relay 580, the front contact and armature 591 of the toll relay 590, the front contact and armature 551 of the busy test relay 550, the back contact and armature 563 of the switch through relay 560, the back contact and armature 494 of relay 490, the back contact and armature 433 of the answer bridge relay 430 to the HS lead extending back to the incoming selector circuit. Thus a busy indication is given to the operator both visually through the flashing of the supervisory lamp 204 and audibly through the operator's telephone set 203. Should the operator, responding to this busy indication, abandon the call then the calling bridge relay 440 will be released and when the first slow relay 450 releases in conventional manner the circuit will be restored to normal by ground applied through the back contact and armature 456 thereof through the back contact and armature 564 to the release magnet 506 of the minor switch and the release magnet 404 of the connector switch.

On a toll call when the operator has completed dialing of the third digit, the selector HS lead is reconnected to a resistance ground which may be traced in this case through the armature 433 and its back contact, the armature 494 and its back contact, the armature 563 and its back contact, armature 551 and its front contact, armature 591 and its back contact and armature 572 and its back contact to the upper winding of the relay 590 to battery. As relay 490 restores, it closes the holding circuit for relay 550 in the manner hereinbefore described and transfers the selector bank HS lead through the upper winding of relay 590 from the back contact of armature 572. This closes a circuit for relay 590 and it operates to connect the 60 IPM lead to the HS lead going back to the selector circuit. The busy indication is passed to the operator in the manner described. Relay 580 is differentially wound and the current flow through the upper winding thereof is opposed to the current in the lower winding thereof closed through the armature 592 of relay 590. Therefore relay 580 does not operate in this circuit.

It should be noted that when the call is not a toll call from an operator's position but a local call from a dial station calling line, there will be no means provided to connect a resistance ground to the HS bank terminal in the selector switch and therefore while the circuit to the upper winding of relay 590 will be closed within the connector circuit as above described, it will be ineffective so that on such a local call only the audible busy signal will be transmitted back to the calling subscriber. The 60 IPM circuit through the upper winding of relay 580 will not be closed.

If the toll operator desires to verify the busy condition of the called line, she dials a suffix digit. The calling bridge relay restores on the first pulse of the train and opens a circuit to relay 450 but has no other function as relay 490 has opened the pulsing circuit. Relay 440 follows the pulses and again closes the circuit for relay 450. The first slow relay therefore remains operated due to its slow releasing characteristics. However, during the dialing the resistance battery on the HS lead is forwarded to this circuit over the selector bank and therefore through the upper winding of relay 580. This relay will now have current flow through its upper winding aiding the current flow through its lower winding and therefore the relay will operate. When this relay operates it closes an alternate holding circuit through the lower winding of relay 590 through the front contact and armature 581 to the master ground wire 405. The operation of relay 580 will also close a circuit which may be traced from battery, the lower winding of relay 570, the armature 582 of the relay 580 and its front contact, the front contact and armature 442 of the calling bridge relay through the contacts of the Z magnet 403 to ground so that relay 570 becomes operated. This relay closes a holding circuit for itself through its upper winding, the alternate contacts of its armature 573 to the master ground wire 405. Through its armature 571 it removes busy tone from the calling line and through its armature 572 it connects resistance ground to the HS lead in place of the 60 IPM battery through the upper winding of relay 580. Upon the operation of relay 570, relay 590 is left locked dependent upon relay 580 so that at the end of this series of pulses when relay 580 is restored, relay 590 is restored. Therefore, a talking circuit is established from the tip brush 508 of the connector through the back contact and armature 593, the front contact and armature 574 of relay 570 to the tip terminal 400 and in like manner from the ring brush 509 through the back contact and armature 594, the front contact and armature 575 to the ring terminal of the connector whereby the operator will be able to talk directly to the party on the busy called line shown as extending to substation 510 among others. During the existence of this connection, resistance ground through the resistance 507, the front contact and armature 572, the back contact and armature 591, the front contact and armature 551, the back contact and armature 563, the back contact and armature 494 and the back contact and armature 433 is connected to the HS lead to cause the operation of the supervisory lamp 204 at the calling operator's position.

Thus the distant toll operator having encountered a busy line is enabled through a simple dialing operation to cause the termination of the busy signal circuits to her cord circuit and to establish a talking circuit directly to the busy line so that she may make a request to free the line if she believes that the proposed connection thereto is sufficiently urgent.

Fig. 6 shows a conventional circuit extending from a dial station calling line 600 through a conventional line circuit 602, a line finder circuit 604 and a selector shown in some detail in the remainder of the circuit. The calling station in making a call causes the starter wire to the allotter 603 to be grounded whereupon the line finder will operate, find the calling line and extend it to the selector. The selector is provided with a calling bridge relay 660, a first slow or release delay relay 670, a second slow relay 680 for holding during the response to a train of dial pulses, a low resistance help relay 690 for helping to drive the switch automatically in its trunk hunting movement and the conventional switch through relay 650 which holds operated after an idle line has been found and until the connection is finally released. When such a local subscriber extends a connection by such means as are shown in Fig. 6 to the connector of Figs. 4 and 5, the connection may be extended to the called line exactly as hereinbefore described with the exception that the HS connection will be without effect as it is open as indicated. Since there is no ground connection to the HS channel, the local subscriber will be unable to affect the connector by dialing a suffix digit after he has received the audible busy signal. As pointed out hereinbefore the calling bridge relay of the connector will respond but the toll relay 590 and the relay 580 will not respond and hence the subscriber at a dial station is denied the privilege of breaking in on a busy line.

What is claimed is:

1. In a telecommunication system, an operator's position, an out dial trunk leading therefrom, a dial station calling line, called lines at a distant point, a connector thereat accessible to said operator's position over said out dial trunk or to said dial station for establishing a connection to the terminals of one of said called lines without completing a talking circuit thereto, means in said connector responsive to the busy condition of a called line for transmitting a busy signal to either said operator's position or said calling line dial station, means in said out dial trunk responsive to an additional train of dial pulses transmitted thereto from said operator's position for transmitting a train of dial pulses and simultaneously therewith a dial train signal corresponding to the train as a whole to said connector, and means in said connector responsive to said dial train signal only for terminating said busy signal and for completing said talking connection to said called line.

2. In a telecommunication system, an operator's position, an out dial trunk leading therefrom, a dial station calling line, called lines at a distant point, an incoming selector at the distant end of said out dial trunk, a connector at said distant point accessible to said calling line and accessible to said incoming selector, each established connection through said connector having a plurality of paths including a talking channel, means in said connector responsive to the busy condition of a called line for transmitting an audible busy signal to either said operator's position or said calling line station without completing said talking channel, and for simultaneously transmitting a different kind of busy signal over another of said paths, means in said out dial trunk responsive to an additional train of dial pulses transmitted thereto from said operator's position for transmitting a train of dial pulses over said talking channel into said connector and simultaneously therewith a dial train signal corresponding to said train as a whole over said another of said paths to said connector, said dial pulses being ineffective in said connector, and means in said connector responsive to said dial train signal only for terminating the transmission of said busy signals and for completing said talking channel to said called line.

3. In a telecommunication system, an operator's position including a visual signal, an out dial trunk leading therefrom, an incoming selector at the distant end of said out dial trunk, a dial station calling line, switching means including a selector accessible to said dial station line, a connector at said distant point accessible to said selectors, called lines accessible to said connector, a talking connection established through either of said selectors into said connector, a cut-through relay in said connector for extending said talking connection to a called line, means in said connector responsive to the busy condition of a called line for transmitting back over said talking connection an audible busy tone and a busy signal to operate said visual signal, another relay in said connector for bridging contacts of said cut-through relay to extend said talking connection to a called line, and means in said incoming selector responsive to dial pulses transmitted from said operator's position and translated in said incoming selector into a single dial train signal for stopping the transmission of said busy signals and for operating said other relay.

4. In a telecommunication system, an operator's position including a visual signal, an out dial trunk leading therefrom, an incoming selector at the distant end of said out dial trunk, a dial station calling line, switching means including a selector accessible to said dial station line, a connector at said distant point accessible to said selectors, said selectors having tip, ring, sleeve and help sleeve brushes and said connector having tip, ring, sleeve and help sleeve terminals on which said selector brushes may be placed, called lines accessible to said connector, a cut-through relay in said connector responsive to the extension of a connection by said connector to an idle called line, another relay in said connector for bridging the contacts of said cut-through relay to extend a connection to a busy called line, means in said connector responsive to the busy condition of a called line for transmitting back over the tip and ring circuit from said connector to a selector an audible busy tone and a busy signal to operate said operator's visual signal, and means in said incoming selector responsive to dial pulses transmitted while said busy signals are operating for translating said dial pulses to a dial train signal and for transmitting said dial train signal over said help sleeve connection to operate said other relay, said other relay also controlling means to stop the transmission of said busy signals from said connector.

References Cited in the file of this patent

UNITED STATES PATENTS

| | | |
|---|---|---|
| 2,377,453 | Rhoads | June 5, 1945 |
| 2,479,276 | Taylor et al. | Aug. 16, 1949 |
| 2,621,257 | Voss et al. | Dec. 9, 1952 |